US 7,062,934 B2

United States Patent
Craps et al.

(10) Patent No.: US 7,062,934 B2
(45) Date of Patent: Jun. 20, 2006

(54) APPARATUS AND METHOD FOR CONTROLLING THE TEMPERATURE OF AN ELECTRONIC DEVICE

(75) Inventors: Terry Craps, Lexington, SC (US); Ian G. Spearing, Westerville, OH (US); Matthew F. W. Brown, Lake St. Louis, MO (US); John E. Voshell, Columbia, SC (US); John D. Ruth, Phoenix, AZ (US)

(73) Assignee: Delta Design, Inc., Poway, CA (US)

( * ) Notice: Subject to any disclaimer, the term of this patent is extended or adjusted under 35 U.S.C. 154(b) by 0 days.

(21) Appl. No.: 10/955,330

(22) Filed: Sep. 30, 2004
(Under 37 CFR 1.47)

(65) Prior Publication Data

US 2005/0241328 A1 Nov. 3, 2005

Related U.S. Application Data

(60) Provisional application No. 60/507,732, filed on Oct. 1, 2003.

(51) Int. Cl.
*F25D 23/12* (2006.01)
*F25B 5/00* (2006.01)
*F25B 41/04* (2006.01)

(52) U.S. Cl. .......... 62/259.2; 62/200; 62/223; 62/504; 62/513

(58) Field of Classification Search .......... 62/259.2, 62/222, 223, 113, 513, 504, 199, 200
See application file for complete search history.

(56) References Cited

U.S. PATENT DOCUMENTS

| 3,768,273 | A | 10/1973 | Mississmer |
| 5,724,832 | A | 3/1998 | Little et al. |
| 6,668,570 | B1 * | 12/2003 | Wall et al. .......... 62/223 |
| 2003/0217558 | A1 | 11/2003 | Wall et al. |
| 2004/0261439 | A1 * | 12/2004 | Wayburn et al. .......... 62/259.2 |

* cited by examiner

*Primary Examiner*—Marc Norman
(74) *Attorney, Agent, or Firm*—Foley & Lardner LLP (57) ABSTRACT

An apparatus for controlling the temperature of an electronic device. The apparatus comprises a refrigeration system including a compressor and a multi-pass heat exchanger. The refrigeration system is operative to circulate a refrigerant fluid through a fluid flow loop such that the refrigerant fluid will change between gaseous and liquid states to alternately absorb and release thermal energy. The refrigerant fluid is pre-cooled in the heat exchanger by a pre-cooling refrigerant stream. A thermal head is connected into the fluid flow loop and has a temperature controlled surface.

20 Claims, 13 Drawing Sheets

APPARATUS AND METHOD FOR CONTROLLING THE TEMPERATURE OF AN ELECTRONIC DEVICE

PRIORITY CLAIM

This application claims priority to Provisional Application Serial No. 60/507,732, filed Oct. 1, 2003, the entire disclosure of which is hereby incorporated by reference.

BACKGROUND OF THE INVENTION

The present invention generally relates to temperature control systems for maintaining the temperature of an electronic device at a predetermined temperature such as while the device is being tested.

Electronic devices, such as integrated circuits, are often tested at temperatures below ambient temperature. This requires a supply of a coolant below the test temperature, which can be used both to bring the device to the setpoint temperature and to act as the conduit for heat rejection when power is applied to the device. In one such implementation, liquid refrigerant at ambient temperatures is expanded in an isenthalpic process to provide cooling at temperatures below ambient at a thermal head. See, for example, pending application Ser. No. 09/871,526, filed on May 31, 2001, which is hereby incorporated by reference.

The temperatures that can be achieved at the thermal head with this process depend on the refrigerant(s) used as well as the temperature and pressure of the refrigerant at the entrance of the isenthalpic expansion device. Generally, as pressure increases or as temperature decreases for the unexpanded refrigerant, more cooling and/or lower temperatures can be achieved at the thermal head. However, there is a limit to the increase in pressure allowable by the unexpanded refrigerant due to the gas physical properties as well as due to practical structural considerations for supply tubing.

SUMMARY OF THE INVENTION

In one aspect, the present invention provides an apparatus for controlling the temperature of an electronic device. The apparatus comprises a refrigeration system including a compressor and a multi-pass heat exchanger. The refrigeration system is operative to circulate a refrigerant fluid through a fluid flow loop such that the refrigerant fluid will change between gaseous and liquid states to alternately absorb and release thermal energy. The refrigerant fluid is pre-cooled in the heat exchanger by a pre-cooling refrigerant stream. A thermal head is connected into the fluid flow loop and has a temperature controlled surface.

In some exemplary embodiments, the apparatus contains a bypass flow to recirculate refrigerant through the heat exchanger without passing the refrigerant through the thermal head.

In another aspect, the present invention provides an apparatus for independently controlling the temperature of multiple electronic devices. The apparatus comprises a refrigeration system including a single compressor connected in parallel to multiple heat exchangers at their warm end. A thermal head with a temperature controlled surface is connected into the fluid flow loop of each heat exchanger. A flow balance heater control is connected to each heat exchanger to provide an additional thermal load and thereby prevent a temperature imbalance between the heat exchangers.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF EXEMPLARY EMBODIMENTS

It is to be understood by one of ordinary skill in the art that the present discussion is a description of exemplary embodiments only and is not intended as limiting the broader aspects of the present invention, which broader aspects are embodied in the exemplary constructions.

Figure 1:
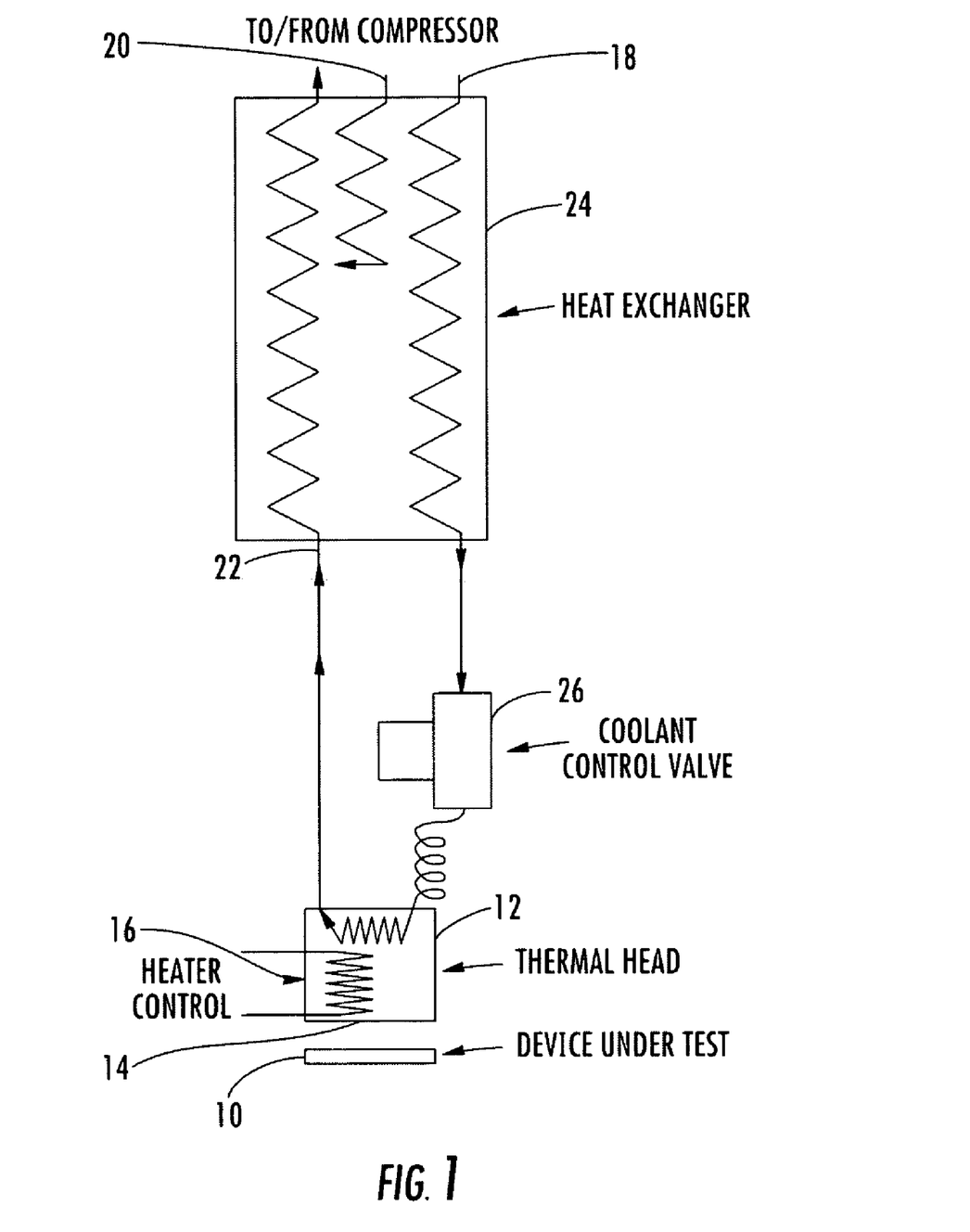
FIGS. 1–10 are diagrammatic representations of various apparatus constructed in accordance with different aspects of the present invention for controlling the temperature of an electronic device under test.

FIG. 1 illustrates an apparatus for controlling the temperature of an electronic device under test 10, such as an integrated circuit. Electronic device 10 is mounted in a suitable test fixture (not shown) so that various read/write commands can be performed to evaluate the performance of device 10.

A thermal head 12 has a temperature controlled surface 14 which can be positioned into thermal contact with device 10. A thermocouple (not shown) or other suitable sensor is provided at temperature controlled surface 14 or alternatively within thermal head 12 to detect the temperature of device 10. Alternatively, the sensor can be mounted on or within device 10, or within a block or device (not shown) interposed between thermal head 12 and device 10. This information is fed to a processor for controlling the operation of thermal head 12 so as to maintain a predetermined temperature. For example, the temperature to be maintained could be entered by a user at a temperature selector. One skilled in the art will recognize that the functions of a processor and temperature selector may be performed by a single digital computer or the like.

Thermal head 12 may be configured having both cooling and heating capability to accurately maintain a wide range of possible temperatures. For example, thermal head may include heating elements 16 or the like to supply thermal energy if the temperature of device 10 drops below the selected temperature. Alternatively, thermal head 12 may be supplied with refrigerant that has been suitably heated to provide a heating action rather than a cooling action upon passing through the thermal head.

If the temperature of the unexpanded refrigerant can be made colder than ambient conditions, it can provide more cooling than a typical refrigeration system providing unexpanded refrigerant at ambient conditions. Toward this end, an auto-cascade system can be provided where a single compressor is used to compress a gas mixture and liquid-gas phase separation and multi-pass heat exchanger is used to achieve low temperatures of the unexpanded refrigerant. General principles of such an arrangement can be discerned with reference to U.S. Pat. No. 5,724,832 to Little et al. and U.S. Pat. No. 3,768,273 to Missimer, both incorporated herein by reference.

In the configuration shown in FIG. 1, a high pressure supply stream 18, a high pressure pre-cooling stream 20, and a low pressure return stream 22 are employed and exchange heat in a heat exchanger 24. Pre-cooling stream 20 enters heat exchanger 24 and is cooled by return stream 22. Pre-cooling stream 20 is then expanded to reduce temperature further and exhausted to return stream 22 part-way within the heat exchanger 24. Supply stream 18 is pre-cooled by the return stream 22 to reach low temperatures.

Upon exiting heat exchanger 24, the flow of supply stream 18 entering thermal head 12 is controlled by a control valve 26. Control valve 26 can provide flow control by pulse-width-modulation of flow through a low impedance valve together with subsequent flow through a fixed restriction, as shown, or can be proportionally controlled by a mechanically or electrically variable restriction within the control valve 26. The amount of restriction within the control valve 26. The amount of restriction of the flow control valve 26 is selected according to the desired test temperatures, cooling capacities, and/or control algorithms required at the thermal head. Return stream 22 exits thermal head 12 as a vapor or 2-phase mixture of liquid refrigerant plus vapor and cools supply stream 18 in heat exchanger 24. Pre-cooling stream 20 and return stream 22 thus provide a bootstrapping operation that allows low temperatures to be reached.

With the system shown in FIG. 1, it is practical to physically locate the multi-pass heat exchanger in close proximity of the thermal head to limit the exposure of any cold tubing and components to parasitic heat leaks from the ambient to the cold refrigerant both before and after expansion and before and after passage of the refrigerant through the thermal head.

This configuration works well when there is a steady flow of refrigerant through heat exchanger 24 and thermal head 12, since steady temperatures are maintained throughout the system and cold liquid refrigerant is always available at control valve 26. In a test environment, however, there are often relatively long periods when control valve 26 is closed, and no return stream 22 flows through heat exchanger 24. After some time, heat exchanger 24 warms, and cold, high pressure refrigerant is no longer available upstream of control valve 26 until after an additional cool down period. This may be undesirable in a test environment, where it is desired to have continuous availability of the cold refrigerant at a consistent initial temperature at the control valve 26 and thermal head 12.

Figure 2:
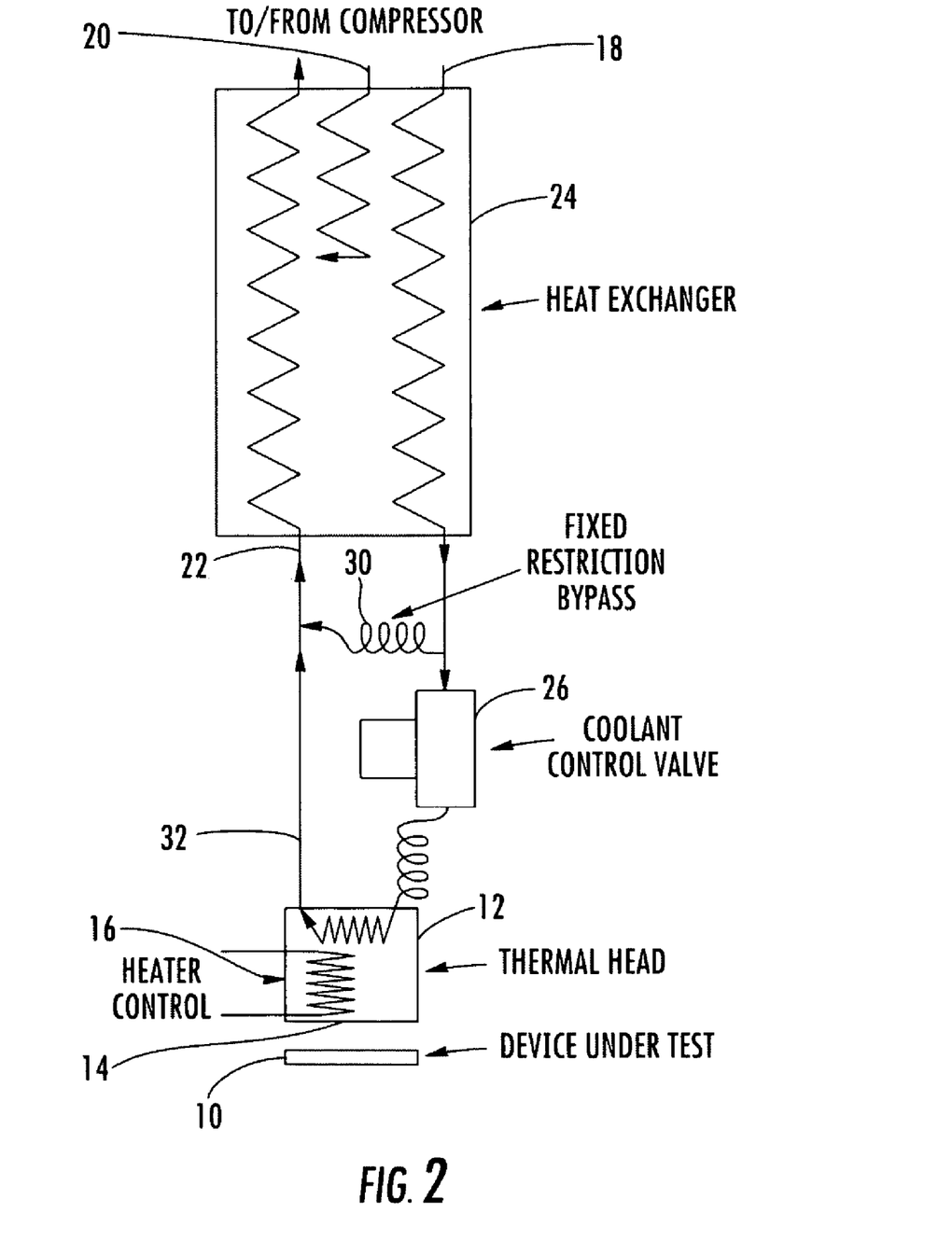

FIG. 2 shows a temperature control system containing a bypass restriction that allows a continuous bypass stream 30 of refrigerant to flow from supply to return regardless of the status of control valve 26. The restriction is sized to balance the constraints of parasitic heat load to heat exchanger 24, minimization of the compressor work to flow the bypass stream, and maximization of thermal stability and capacity of the thermal head.

Additionally, bypass stream 30 allows operation of thermal head 12 at temperatures above the unexpanded refrigerant supply temperature by ensuring that the combined return stream 22 composed of bypass stream 30 and thermal head exhaust stream 32 is maintained sufficiently cold to ensure a supply of cold refrigerant is still available from heat exchanger 24. At high temperature setpoints for thermal head 12, without bypass stream 30, the temperature of supply stream 18 would gradually climb with the return stream 22 inlet temperature, and control stability at thermal head 12 would be negatively impacted, or even lost entirely.

Figure 3:
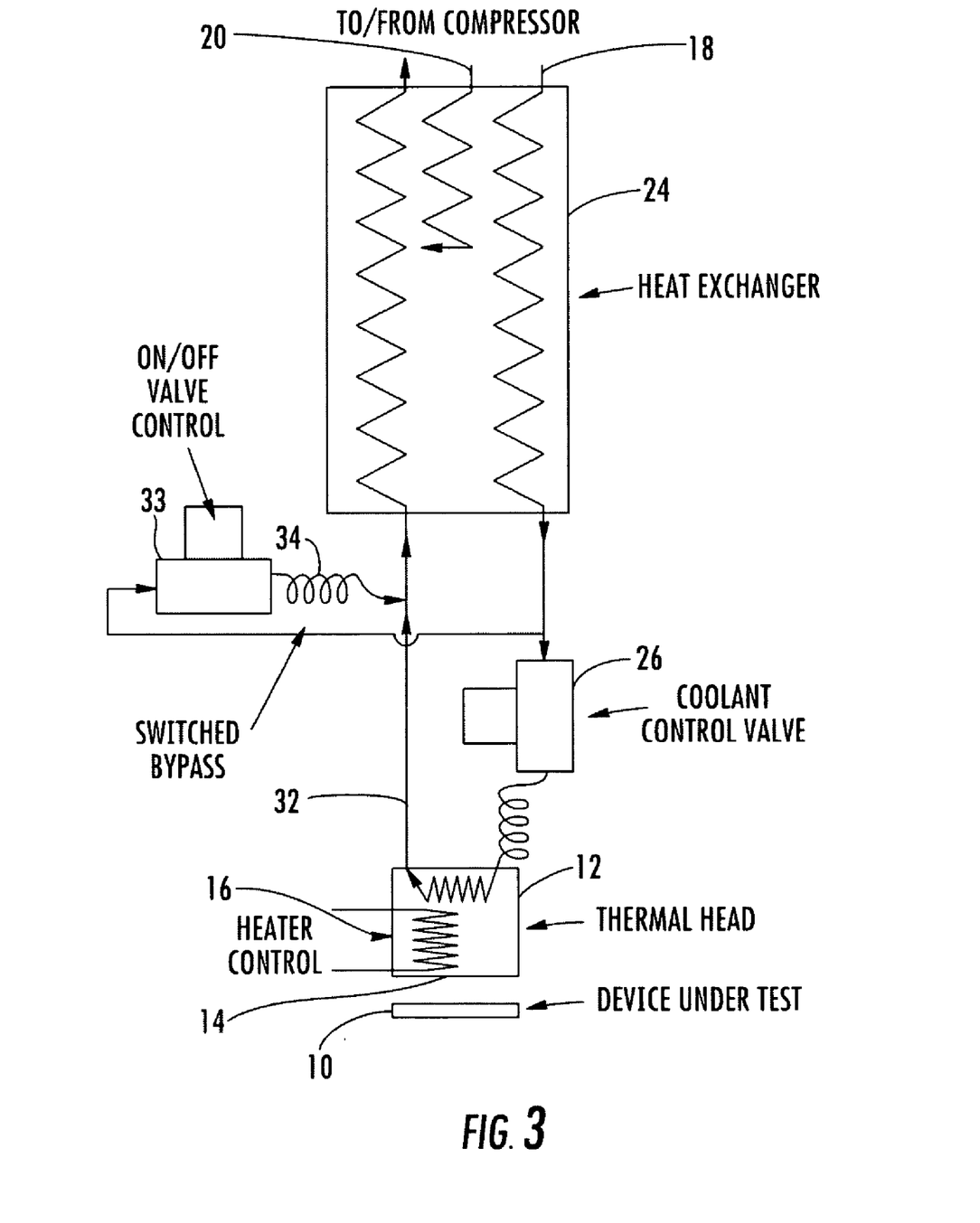

Another example bypass configuration is shown in FIG. 3. A switched bypass flow valve 33 can be turned on or off via an external control signal in coordination with control valve 26, thereby allowing or preventing flow through bypass 34. Several modes of operation for the switched bypass are possible. For example, bypass flow valve 33 can be maintained in an open position during testing, which operates flow through bypass 34 in the same manner as the fixed restriction. Bypass flow valve 33 can be closed during idle periods or left open as operating practices warrant.

In another mode, bypass flow valve 33 can be switched in a complementary fashion with respect to control valve 26, so that flow from heat exchanger supply 18 and 20 flows either through thermal head 12 or through bypass, but not both at the same time. In this way, the compressor and heat exchanger 24 can see an almost constant flow of refrigerant, mimicking a pseudo-steady-state operation, so that from the point of view of heat exchanger 24 and the compressor, it is unknown whether at any given instant flow is through thermal head 12 or through bypass 34. This provides temperature stability to heat exchanger 24 that improves control of thermal head 12, and mechanical stability to the compressor that extends compressor life.

In another exemplary mode, bypass flow valve 33 can be activated only for thermal head temperature setpoints above the desired supply refrigerant temperature, so that the combined flow of thermal head exhaust stream 32 and bypass 34 maintains a temperature of return stream 22 which is colder than the desired temperature of supply stream 18.

Figure 4:
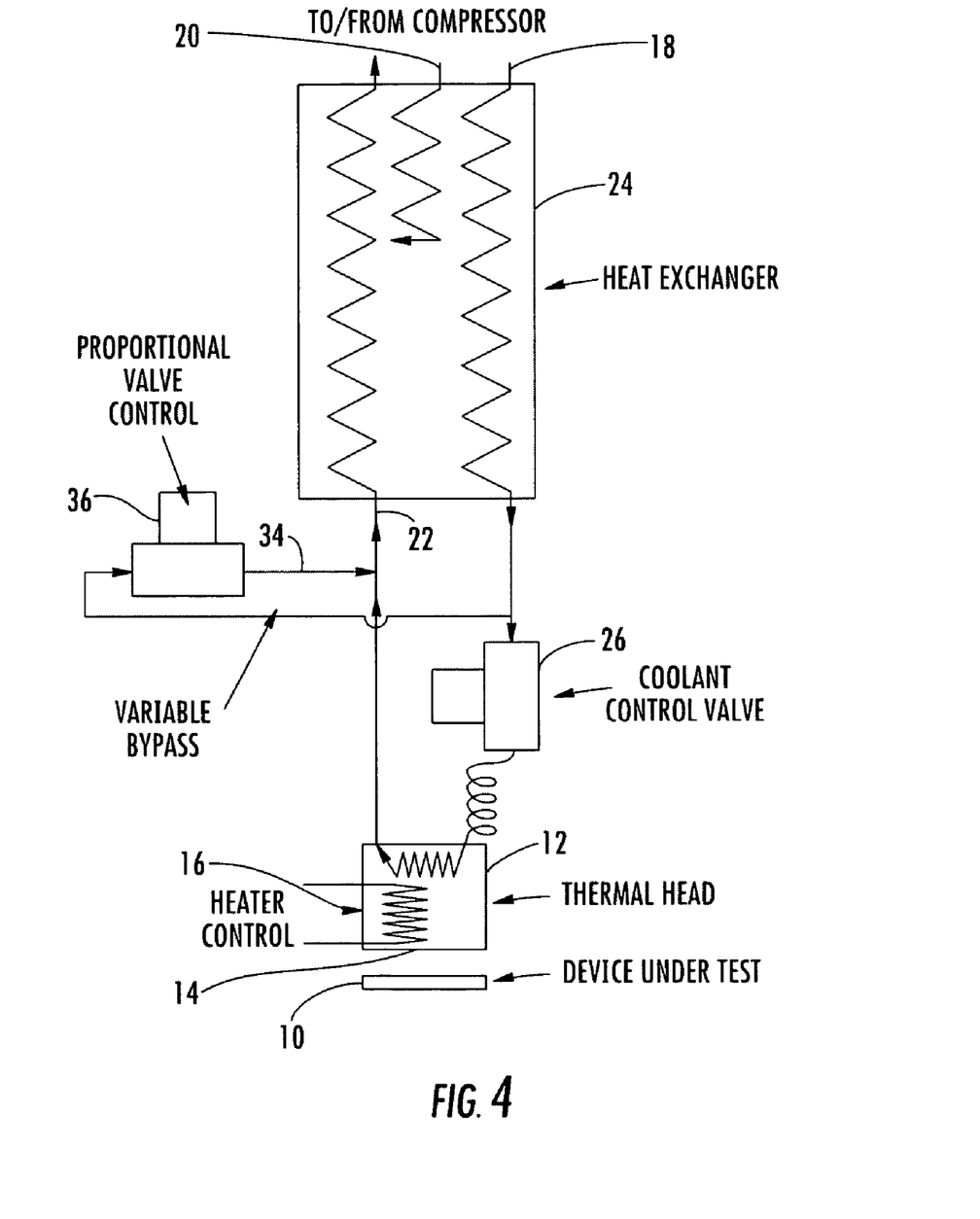

In another mode, the flow through bypass 34 could be controlled by varying the effective restriction of bypass 34, such as by pulse width modulation. The variation in flow is useful to control the temperature of supply stream 18, in particular as the thermal head setpoint temperature rises above the temperature of supply stream 18. Also, the variation in flow can provide temperature stability when the flow through thermal head 12 varies considerably. Moreover, the variation in flow can provide a greater flow through heat exchanger 24 during cool down to speed attainment of the desired temperature setpoint during initial startup. The flow through bypass 34 can also be controlled using a proportional valve 36, as shown in FIG. 4.

Figure 5:
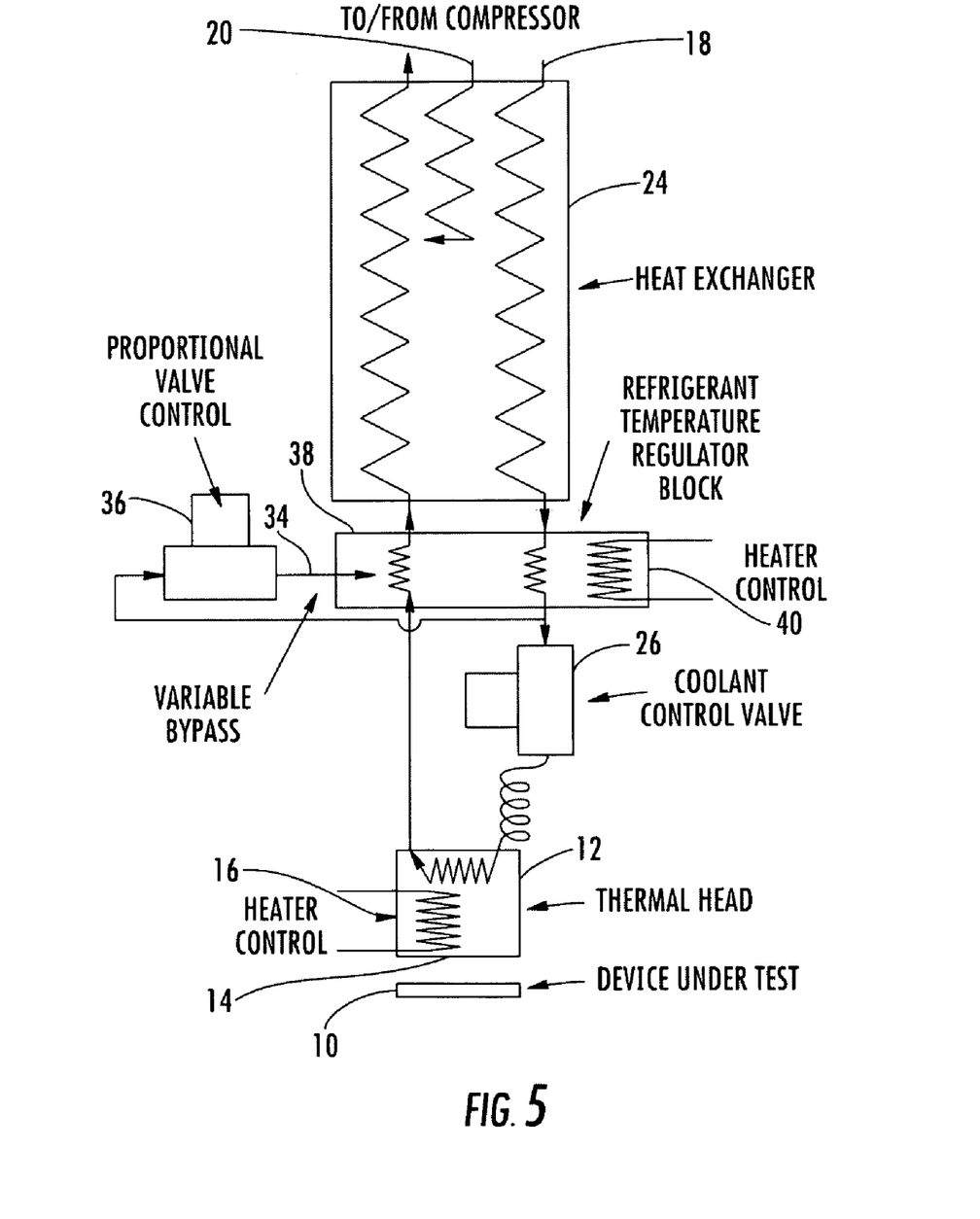
Figure 5A:
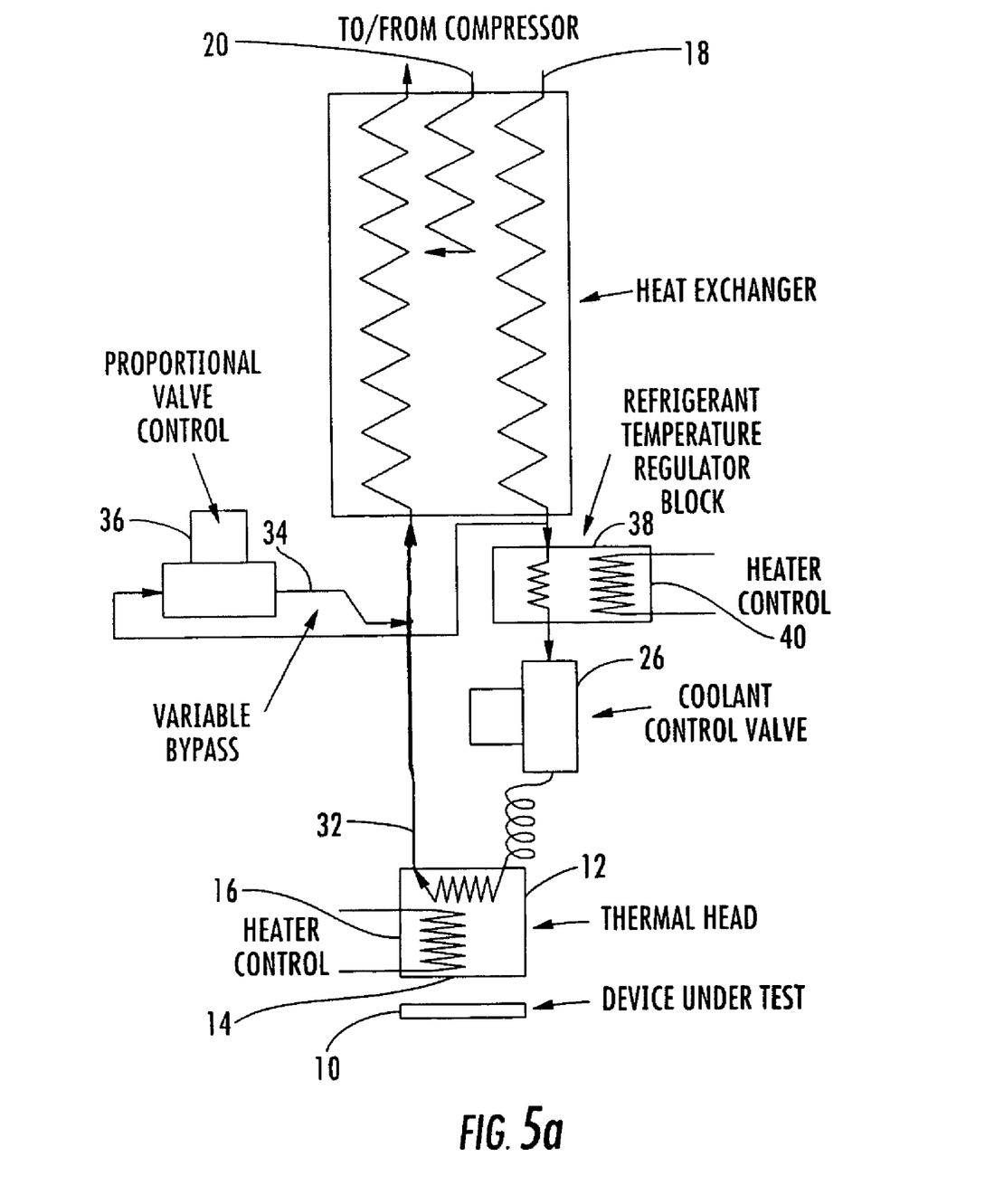

As shown in FIG. 5, temperature control of supply stream 18 can be further enhanced by the use of a stabilizing block 38 having its temperature actively controlled. Using a controlled bypass flow (such as proportional control as shown or switched control as previously described), through a block of material acting as a "thermal sink" or "thermal inertia," the temperature oscillations that can occur during variations in thermal load at thermal head 12 can be damped. This provides a more consistent supply of refrigerant to control valve 26 that in turn improves refrigerant control to thermal head 12, thereby improving temperature control of the thermal head 12 as desired for device testing. A heater control 40 can also be used to further enhance control of the temperature of stabilizing block 38. FIG. 5a shows another embodiment in which stabilizing block 38 is not thermally connected to the return stream 22, but only to supply stream 18.

Figure 6:
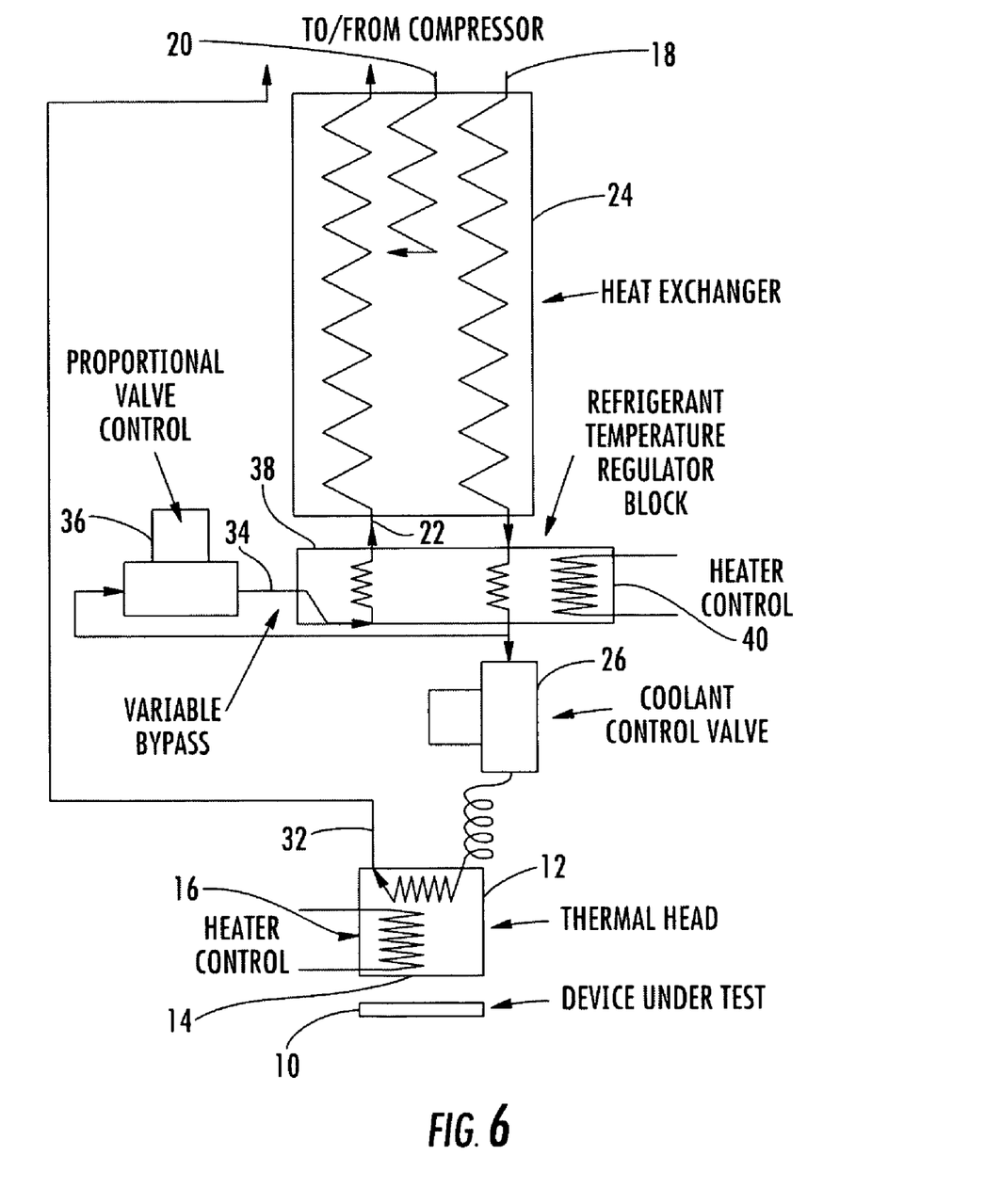

Referring now to FIG. 6, when the temperature of thermal head exhaust stream 32 is below that of supply stream 18, it is advantageous to return thermal head exhaust stream 32 through heat exchanger 24 to provide additional counterflow cooling to supply stream 18, as described previously. When the temperature of thermal head exhaust stream 32 is above that of supply stream 18, however, it can be advantageous to divert thermal head exhaust stream 32 past heat exchanger 24. In this way, the relatively hot thermal head exhaust stream 32 does not tend to warm supply stream 18. An example of such a system is shown in FIG. 6, in which a thermal head exhaust stream 32 is bypassed directly from thermal head 12 to the compressor.

Figure 7:
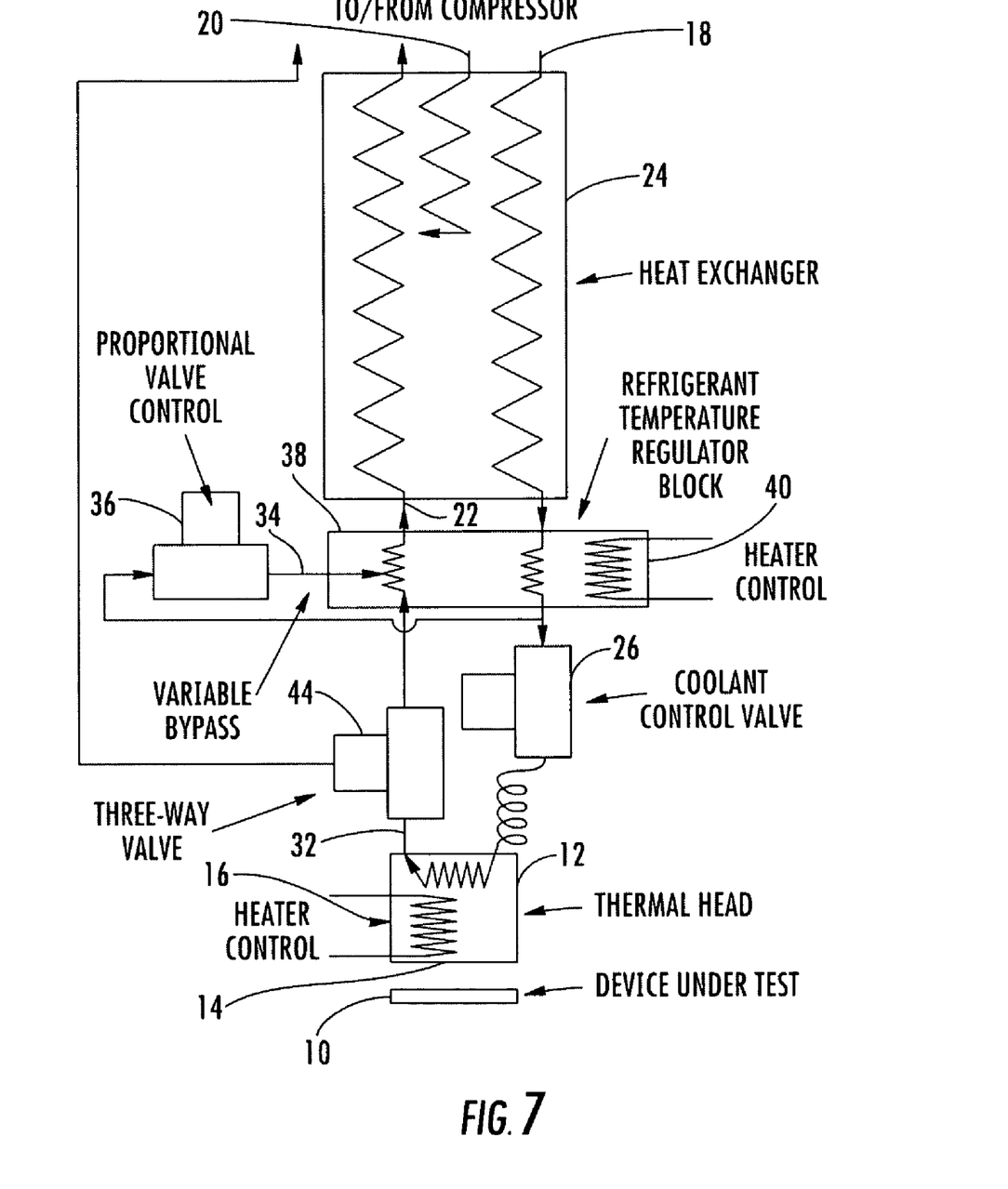

When the setpoint temperature of thermal head 12 can vary over a wide span, it may be advantageous to pass thermal head exhaust stream 32 through the heat exchanger 24 in some circumstances (primarily at cold temperature setpoints of the thermal head 12) while diverting it in other circumstances (primarily at hot temperature setpoints of the thermal head 12). This behavior can be achieved by the use of a three-way valve 44 on thermal head exhaust stream 32, as shown in FIG. 7. The direction of the thermal head exhaust stream 32 can also be achieved by the use of two two-way valves, where the valves are operated in complementary fashion to direct the flow through only one or the other flow streams.

Figure 8:
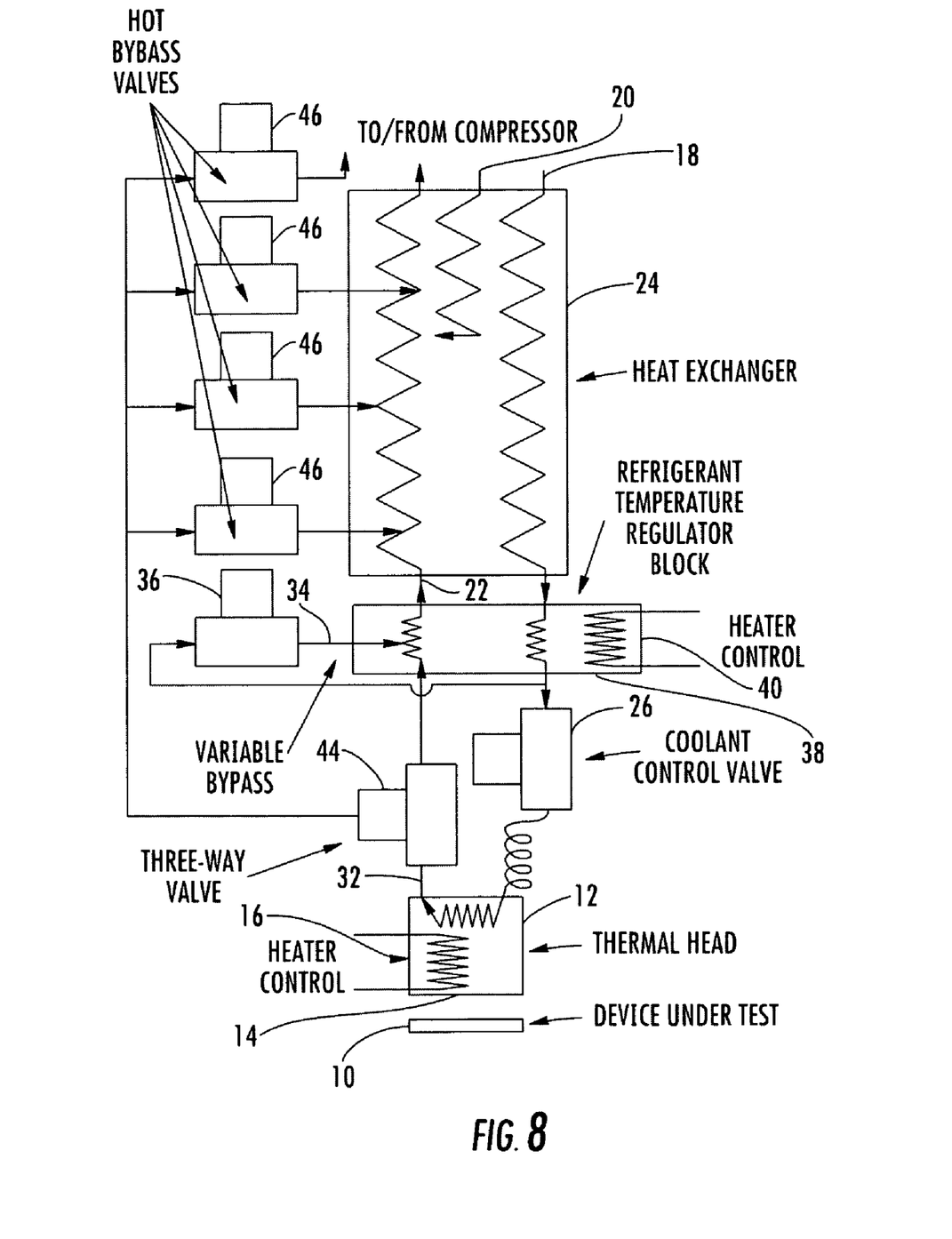

In some circumstances, thermal head exhaust stream 32 may be too warm to be introduced at the cold end of heat exchanger 24, but may still be sufficiently cold to augment the cooling of the pre-cooling stream 20 if introduced at some intermediate point in heat exchanger 24. FIG. 8 shows an example arrangement of an array of hot head bypass valves 46 positioned at various points along heat exchanger 24 so that introduction of the thermal head exhaust stream 32 can be optimized to maximize the thermal effectiveness of heat exchanger 24 and maximize the available cooling capacity for thermal head 12. In FIGS. 5, 7 and 8, flow is shown entering stabilization block 38 from thermal head 12, where flow could instead be directed to heat exchanger 24, bypassing stabilization block 38.

To reduce equipment costs when multiple thermal heads are required in distinct locations remote from each other, it is sometimes advantageous to use a single compressor connected to several heat exchangers connected in parallel at their warm end. When configured this way, due to variations in parasitic loading as well as variations in manufacturing tolerances, it is possible for the multiple exchangers to experience a flow imbalance that leads to a thermal imbalance where the cold refrigerant supply temperatures do not match. When the temperature of one exchanger deviates from the other exchangers and gets colder, it can experience a thermal runaway effect where there is reduced pressure drop through the exchanger due to the changes in the heat exchange gas properties with temperature, which further increases the flow through the exchanger and further decreases its temperature. The increased flow to the runaway exchanger can prevent sufficient flow through the other exchangers, thereby causing them to warm.

Figure 9:
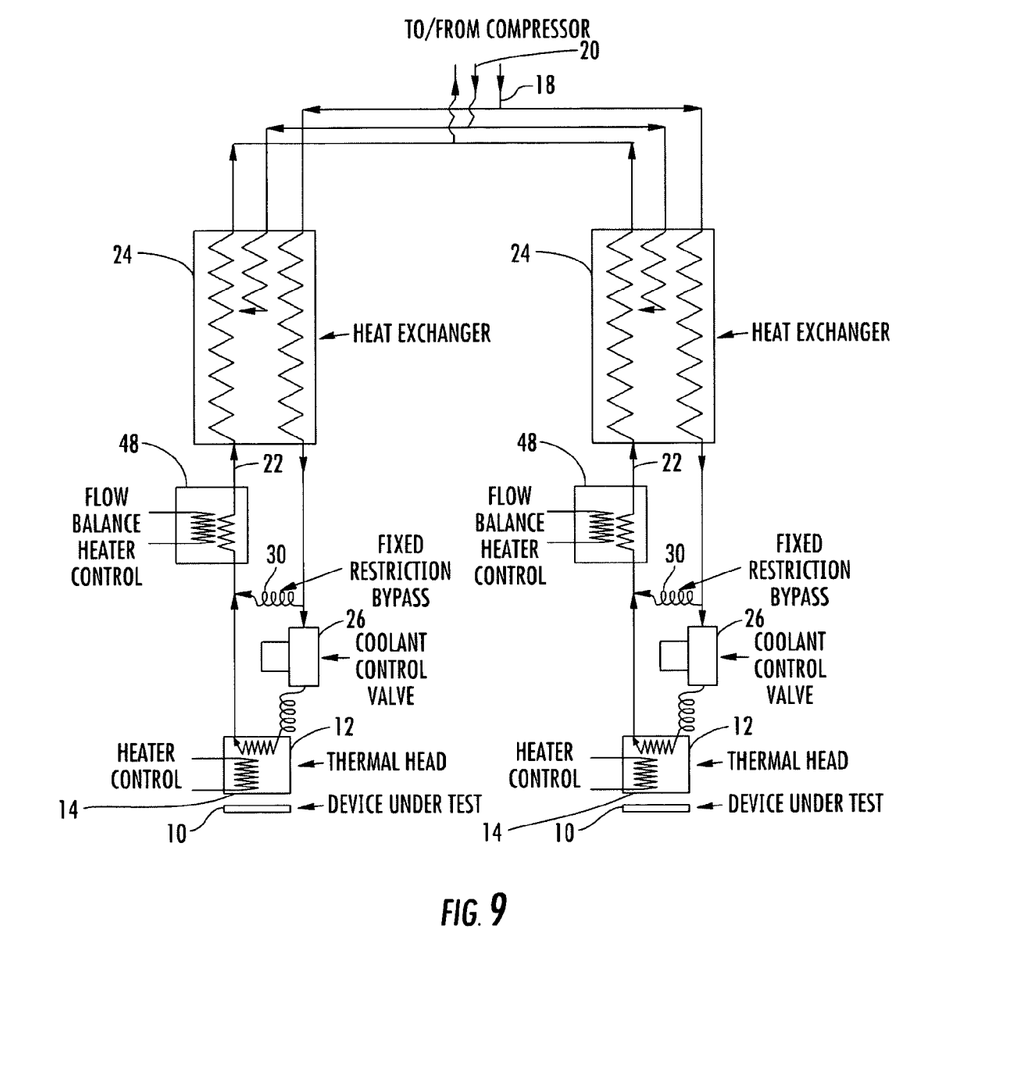
Figure 9A:
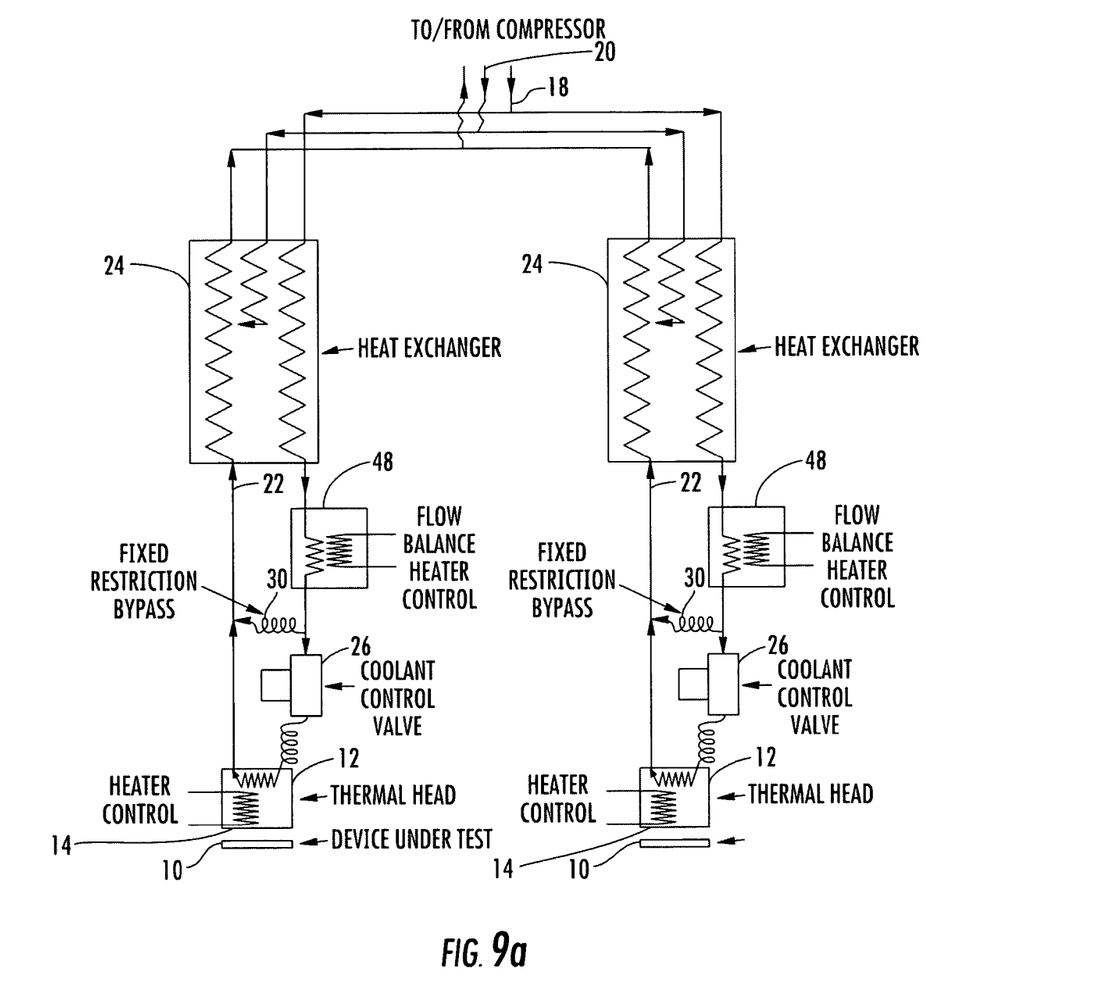

The present invention provides methods to ensure that all heat exchangers have the same refrigerant supply temperature despite variations in loading and manufacturing tolerances. One such method of re-balancing the heat exchangers is by the introduction of a flow balance heater control 48, as shown in FIG. 9 for two thermal heads. FIG. 9a shows another embodiment in which flow balance heater control 48 is positioned on supply line 18, which serves both as the rebalancing component and as a pre-conditioning component to maintain the liquid supply temperature at the flow control valve 48 at a desired setpoint for stability of refrigerant and temperature control for the thermal head.

If a heat exchanger 24 starts getting colder than its desired setpoint by some tolerance, flow balance heater control 48 is turned on to provide additional thermal load to the heat exchanger 24. This tends to warm the heat exchanger 24 back to the desired setpoint both by increasing the thermal load on the heat exchanger and by decreasing or inverting the temperature difference between supply stream 18 and return stream 22.

Flow balance heater control 48 is preferentially placed at the return stream 22 inlet of heat exchanger, but could also be placed anywhere along heat exchanger 24 where supply stream 18 and return stream 22 exchange heat. Flow balance heater control 48 could also be placed on supply stream 18 inlet before heat exchanger 24.

The bypass restriction shown in FIG. 9 can be any of the previously described implementations, including the first shown implementation where there is no bypass. The heater control can be on/off, proportional, pulse width modulated (PWM), based on a proportional, integral, derivative (PID) or other control strategy. Multi-exchange balance control can also be achieved by operation of each flow legs' thermal stabilization blocks controlled to equal set point temperatures.

Figure 10:
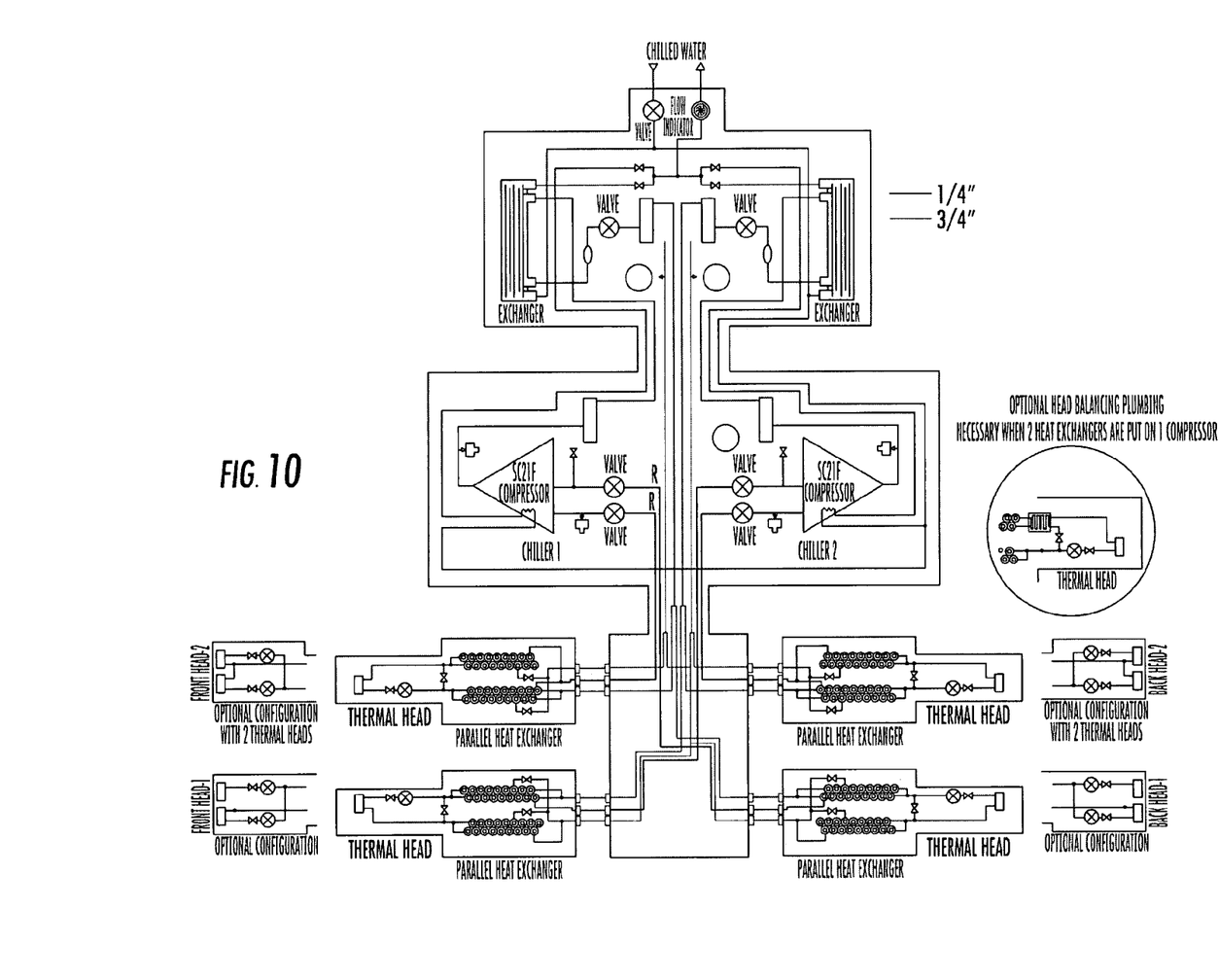

FIG. 10 illustrates an example arrangement using two compressors for four thermal heads.

Figure 11:
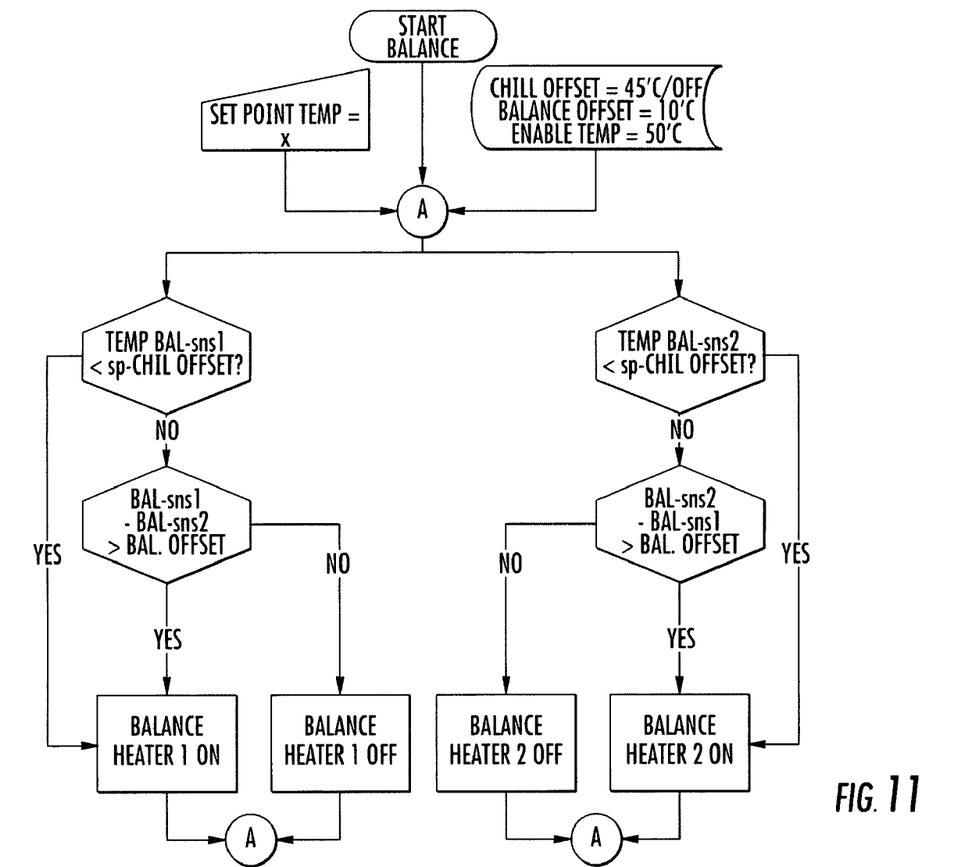
FIG. 11 is a flow diagram of an embodiment for controlling the flow balance heater controls.

FIG. 11 illustrates an example flow diagram for controlling flow balance heater controls 48.

While preferred embodiments of the invention have been shown and described, modifications and variations may by made thereto by those of skill in the art without departing from the spirit and scope of the present invention. It should also be understood that aspects of various embodiments may be interchangeable in whole or in part. Furthermore, those of ordinary skill in the art will appreciate that the foregoing description is by way of example only, and is not intended to be limitative of the invention described herein.

What is claimed is:

1. An apparatus for controlling the temperature of an electronic device, said apparatus comprising:
    a refrigeration system including a compressor, said refrigeration system being operative to circulate a refrigerant through a fluid flow loop such that said refrigerant will change between gaseous and liquid states so as to alternately absorb and release thermal energy;
    a thermal head having a temperature controlled surface, said thermal head defining a flow channel for passage of said refrigerant to thereby function as an evaporator in said refrigeration system;
    a heat exchanger located between said thermal head and said compressor in said fluid flow loop, said heat exchanger defining a supply channel to introduce said refrigerant into said thermal head, a return channel for receiving refrigerant exiting said thermal head and a pre-cooling channel adapted to receive said refrigerant from said compressor and exhaust said refrigerant to said return channel;
    a control valve located between said heat exchanger and said thermal head in said fluid flow loop, said control valve being operative to regulate introduction of said refrigerant into said flow channel of said thermal head; and
    a controller operative to control said control valve for maintaining a predetermined temperature at said temperature controlled surface.

2. The apparatus as recited in claim 1, wherein said control valve is a pulsing valve operated by a pulse width modulated (PWM) signal.

3. The apparatus as recited in claim 1, wherein said control valve is adapted to be proportionally controlled by a mechanically variable restriction.

4. The apparatus as cited claim 1, wherein said control valve is adapted to be proportionally controlled by a mechanically variable restriction.

5. The apparatus as recited in claim 1, wherein said heat exchanger and said thermal head are in close physical proximity.

6. The apparatus as recited in claim 1, further comprising a bypass restriction adapted to divert said refrigerant exiting said heat exchanger towards said control valve to said return channel.

7. The apparatus as recited in claim 6, wherein said bypass restriction being located downstream of said heat exchanger.

8. The apparatus as recited in claim 6, wherein said bypass restriction is a bypass flow valve that can be switched based upon a control signal.

9. The apparatus as recited in claim 8, wherein said bypass flow valve is capable of being switched in a complementary manner with respect to said control valve such that said refrigerant flows either through said thermal head or said bypass flow valve.

10. The apparatus as recited in claim 8, wherein said bypass flow valve is capable of being switched to divert said refrigerant when said thermal head reaches a selected temperature.

11. The apparatus as recited in claim 8, wherein said bypass flow valve controls said refrigerant from entering said thermal head by varying the effective restriction of said bypass flow valve.

12. The apparatus as recited in claim 11, wherein said bypass flow valve is a pulsing valve operated by a pulse width modulated (PWM) signal.

13. The apparatus as recited in claim 11, wherein said bypass flow valve is a proportional valve.

14. The apparatus as recited in claim 8, further comprising a stabilizing block located between said heat exchanger and said thermal head, said stabilizing block adapted to dampen temperature variations of said refrigerant exiting said supply channel.

15. The apparatus as recited in claim 8, further comprising a stabilizing block located between said heat exchanger and said thermal head, said stabilizing block adapted to dampen temperature variations of said refrigerant entering said return channel.

16. The apparatus as recited in claim 8, further comprising means for selectively diverting said refrigerant exiting said thermal head directly to said compressor.

17. The apparatus as recited in claim 16, further comprising an array of hot head bypass valves arranged in fluid communication at multiple points along said return channel, at least one of said array of hot head bypass valves arranged at a selected point along said return channel, said diverting means adapted to introduce said refrigerant to said selected point along said return channel based upon the temperature of said refrigerant exiting said thermal head.

18. An apparatus for controlling the temperature of an electronic device, said apparatus comprising:
- a refrigeration system including a compressor, said refrigeration system being operative to circulate a refrigerant through a fluid flow loop such that said refrigerant will change between gaseous and liquid states so as to alternately absorb and release thermal energy;
- at least two thermal head with each having a temperature controlled surface, each of said thermal heads defining a flow channel for passage of said refrigerant;
- a heat exchanger located between each of said thermal heads and said compressor in said fluid flow loop, said heat exchanger defining a supply channel to introduce said refrigerant into each of said thermal heads, a return channel for receiving refrigerant exiting each of said thermal heads and a pre-cooling channel adapted to receive said refrigerant from said compressor and exhaust said refrigerant to said return channel;
- a control valve located between said heat exchanger and each of said thermal head in fluid flow loop, said control valve being operative to regulate introduced of said refrigerant into said flow channel of each of said thermal heads;
- a controller operative to control said control valve for maintaining a predetermined temperature at said temperature controlled surface of each of said thermal heads; and
- a flow balance heater located in the flow loop between each of thermal heads and said compressor for selectively increasing the thermal load.

19. The apparatus as recited in claim 18, wherein said flow balance heater control is located in the flow loop between each of said thermal heads and said heat exchanger.

20. A method of maintaining multiple electronic devices at a predetermined temperature, said method comprising the steps of:
(a) providing a refrigeration system having a compressor with multiple associated heat exchangers and thermal heads, each of said thermal heads including a temperature controlled surface in thermal contact with an electronic device;
(b) provided a flow balance heater control associated with each of said heat exchangers; and
(c) if the temperature of a heat exchanger falls below a selected temperature, activating said flow balance heater control to provide an additional thermal load on said heat exchanger.

* * * * *